US012299948B2

(12) United States Patent
Cherubini et al.

(10) Patent No.: US 12,299,948 B2
(45) Date of Patent: May 13, 2025

(54) SYSTEMS AND METHODS FOR CONTEXTUAL IMAGE ANALYSIS

(71) Applicant: COSMO ARTIFICIAL INTELLIGENCE-AI LIMITED, Dublin (IE)

(72) Inventors: Andrea Cherubini, Lainate (IT); Nhan Ngo Dinh, Rome (IT)

(73) Assignee: COSMO ARTIFICIAL INTELLIGENCE—AI LIMITED, Dublin (IE)

( * ) Notice: Subject to any disclaimer, the term of this patent is extended or adjusted under 35 U.S.C. 154(b) by 358 days.

(21) Appl. No.: 17/794,216

(22) PCT Filed: Jan. 29, 2021

(86) PCT No.: PCT/EP2021/052215
§ 371 (c)(1),
(2) Date: Jul. 20, 2022

(87) PCT Pub. No.: WO2021/156159
PCT Pub. Date: Aug. 12, 2021

(65) Prior Publication Data
US 2023/0050833 A1 Feb. 16, 2023

Related U.S. Application Data

(60) Provisional application No. 62/969,643, filed on Feb. 3, 2020.

(51) Int. Cl.
*G06V 10/25* (2022.01)
*G06T 7/00* (2017.01)
*G06V 10/82* (2022.01)

(52) U.S. Cl.
CPC ............ *G06V 10/25* (2022.01); *G06T 7/0012* (2013.01); *G06V 10/82* (2022.01);
(Continued)

(58) Field of Classification Search
CPC ........ G06N 3/0464; G06N 7/01; G06V 10/82; G06V 10/25; G06V 10/764; G06V 10/768;
(Continued)

(56) References Cited

U.S. PATENT DOCUMENTS 10,192,107 B2 * 1/2019 Yu ........................ G06V 40/103
10,267,661 B2 * 4/2019 Ott .......................... G01D 18/00
(Continued)

FOREIGN PATENT DOCUMENTS

CN         103946838 B   * 10/2017   ........... G06F 16/532
CN         110495847 A     11/2019
WO   WO-2016161115 A1   * 10/2016   ........... A61B 5/0084

OTHER PUBLICATIONS

PCT International Search Report and Witten Opinion in corresponding with PCT Application No. PCT/EP2021/052215, mailed May 3, 2021. (11 pages).

*Primary Examiner* — Dung Hong

(57) ABSTRACT

In one implementation, a computer-implemented system is provided for real-time video processing. The system includes at least one memory configured to store instructions and at least one processor configured to execute the instructions to perform operations. The at least one processor is configured to receive real-time video generated by a medical image system, the real-time video including a plurality of image frames, system. The at least processor is also configured to perform an object detection to detect and obtain context information indicating an interaction of a user with the medical image at least one object in the plurality of image frames and perform a classification to generate classification information for at least one object in the plurality of image frames. Further, the at least one processor is configured to perform a video manipulation to modify the received real-time video based on at least one of the object (Continued)

detection and the classification. Moreover, the processor is configured to invoke at least one of the object detection, the classification, and the video manipulation based on the context information.

32 Claims, 10 Drawing Sheets

(52) U.S. Cl.
CPC .............. *G06T 2207/20104* (2013.01); *G06V 2201/03* (2022.01); *G06V 2201/07* (2022.01)

(58) Field of Classification Search
CPC ............. G06V 10/809; G06V 2201/03; G06V 2201/07; G06T 7/0012; G06T 2207/20104
See application file for complete search history.

(56) References Cited

U.S. PATENT DOCUMENTS

| | | | |
|---|---|---|---|
| 2013/0342640 A1* | 12/2013 | Li | H04N 19/59 375/240.08 |
| 2017/0206095 A1* | 7/2017 | Gibbs | G06F 3/167 |
| 2018/0068431 A1* | 3/2018 | Takeda | G06T 7/74 |
| 2018/0296281 A1 | 10/2018 | Yeung et al. | |
| 2019/0297276 A1 | 9/2019 | Sachdev et al. | |
| 2019/0385018 A1 | 12/2019 | Ngo Dinh et al. | |
| 2019/0385302 A1* | 12/2019 | Ngo Dinh | A61B 1/31 |

* cited by examiner

SYSTEMS AND METHODS FOR CONTEXTUAL IMAGE ANALYSIS

CROSS-REFERENCE TO RELATED APPLICATION(S)

This application claims priority to U.S. Provisional Application No. 62/969,643 filed on Feb. 3, 2020, the entire contents of which is incorporated herein by reference.

TECHNICAL FIELD

The present disclosure relates generally to computer-implemented systems and methods for contextual image analysis. More specifically, and without limitation, this disclosure relates to computer-implemented systems and methods for processing real-time video and performing image processing operations based on context information. The systems and methods disclosed herein may be used in various applications and vision systems, such as medical image analysis and systems that benefit from accurate image processing capabilities.

BACKGROUND

In image analysis systems, it is often desirable to detect objects of interest in an image. An object of interest may be a person, place, or thing. In some applications, such as systems for medical image analysis and diagnosis, the location and classification of the detected object (e.g., an abnormality such as a formation on or of human tissue) is important as well. However, extant computer-implemented systems and methods suffer from a number of drawbacks, including the inability to accurately detect objects and/or provide the location or classification of detected objects. In addition, extant systems and methods are inefficient in that they may indiscriminately perform image processing operations unnecessarily and/or without regard to the real-time context or use of the image device. As used herein, "real-time" means to occur or process immediately.

Some extant medical imaging systems are built on a single detector network. Once a detection is made, the network simply outputs the detection, e.g., to a physician or other health care professional. However, such detections may be false positives, such as non-polyps in endoscopy or the like. Such systems do not provide a separate network for differentiating false positives from true positives.

Furthermore, object detectors based on neural networks usually feed features identified by a neural network into the detector, which may comprise a second neural network. However, such networks are often inaccurate because feature detection is performed by a generalized network, with only the detector portion being specialized.

Extant medical imaging systems for real-time applications also have other disadvantages. For example, such systems are often designed to operate without regard to the context of use or real-time interaction between a physician or other user and a medical image device that generates the video frames for processing.

Moreover, extant medical imaging systems for real-time applications do not use contextual information derived from the interaction between the physician or other user and the medical image device to aggregate objects identified by object detectors along a temporal dimension.

Furthermore, extant medical imaging systems for real-time applications do not use contextual information derived from the interaction between the user and the medical image device to activate or de-activate specific neural network(s) able to perform specific tasks, such as detecting an object, classifying a detected object, outputting an object characteristic, or modifying the way information is visualized on the medical display for the user's benefit.

In view of the foregoing, the inventors have identified that there is a need for improved systems and methods for image analysis, including for medical image analysis and diagnosis. There is also a need for improved medical imaging systems that can accurately and efficiently detect objects and provide classification information. Still further there is a need for image analysis systems and methods that can perform real-time image processing operations based on context information.

SUMMARY

In view of the foregoing, embodiments of the present disclosure provide computer-implemented systems and methods for processing real-time video from an image device, such as a medical image system. The disclosed systems and methods may be configured to perform image processing operations, such as object detection and classification. The disclosed systems and methods may also be configured to identify an interaction of a user with an image device using context information, and perform image processing based on the identified interaction by applying, for example, one or more neural networks trained to process image frames received from the image device, or to modify the way information is visualized on the display based on context information. The systems and methods of the present disclosure provide benefits over extant systems and techniques, including by addressing one more of the above-referenced drawbacks and/or other shortcomings of extant systems and techniques.

In some embodiments, image frames received from the image device may include image frames of a human organ. For example, the human organ may include a gastro-intestinal organ. The frames may comprise images from the medical image device used during at least one of an endoscopy, a gastroscopy, a colonoscopy, an enteroscopy, a laparoscopy, or a surgical endoscopy. In various embodiments, an object of interest contained in the image frames may be a portion of human organ, a surgical instrument, or an abnormality. The abnormality may comprise a formation on or of human tissue, a change in human tissue from one type of cell to another type of cell, and/or an absence of human tissue from a location where the human tissue is expected. The formation on or of human tissue may comprise a lesion, such as a polypoid lesion or a non-polypoid lesion. Consequently, the disclosed embodiments may be utilized in a medical context in a manner that is not specific to any single disease but may rather be generally applied.

In some embodiments, context information may be used to determine which image processing operation(s) should be performed. For example, the image processing operation(s) may comprise the activation or de-activation of specific neural network(s) such as an object detector, an image classifier, or an image similarity evaluator. Additionally, the image processing operation(s) may comprise the activation or de-activation of specific neural network(s) adapted to provide information about the detected object, such as the class of the object or a specific feature of the object.

In some embodiments, context information may be used to identify a user interaction with the image device. For example, context information may indicate that the user is interacting with the image device to identify objects of interest in an image frame. Subsequently, context information may indicate that the user is no longer interacting with the image device to identify objects of interest. By way of further example, context information may indicate that the user is interacting with the image device to examine one or more detected objects in an image frame. Subsequently, context information may indicate that the user is no longer interacting with the image device to examine one or more detected objects in an image frame. It is to be understood, however, that context information may be used to identify any other user interactions with the image device or associated equipment with the medical image system, such as showing or hiding display information, performing video functions (e.g., zooming into a region containing the object of interest, altering image color distribution, or the like), saving captured image frames to a memory device, powering the image device on or off, or the like.

In some embodiments, context information may be used to determine whether to perform aggregation of an object of interest across multiple image frames along a temporal dimension. For example, it may be desirable to capture all image frames containing an object of interest such as a polyp for future examination by a physician. In such circumstances, it may be advantageous to group all image frames containing the object of interest captured by the image device. Information, such as a label, timestamp, location, distance traveled, or the like, may be associated with each group of image frames to differentiate them between one another. Other methods may be used to perform aggregation of the object of interest, such as altering color distribution of the image frames (e.g., using green to denote a first object of interest, and using red to denote a second object of interest), adding alphanumeric information or other characters to the image frames (e.g., using "1" to denote a first object of interest, and using "2" to denote a second object of interest), or the like.

Context information may be generated by a variety of means, consistent with disclosed embodiments. For example, the context information may be generated by using an Intersection over Union (IoU) value for the location of a detected object in two or more image frames over time. The IoU value may be compared with a threshold to determine the context of a user's interaction with the image device (e.g., the user is navigating the image device to identify objects). In some embodiments, the IoU value meeting the threshold over a predetermined number of frames or time may establish a persistence required to determine the user interaction with the image device.

In some embodiments, the context information may be generated by using an image similarity value or other specific image feature of the detected object in two or more image frames over time. The image similarity value or other specific image feature of the detected object may be compared with a threshold to determine the context of a user's interaction with the image device (e.g., the user is navigating the image device to identify objects). In some embodiments, the image similarity value or another specific image feature of the detected object meeting the threshold over a predetermined number of frames or time may establish a persistence required to determine the user interaction with the image device.

The disclosed embodiments may also be implemented to obtain the context information based on a presence or an analysis of multiple objects present simultaneously in the same image frame. The disclosed embodiments may also be implemented to obtain the context information based on an analysis of the entire image (i.e., not just the identified object). In some embodiments, the context information is obtained based on classification information. Additionally, or alternatively, the context information may be generated based on a user input received by the image device which indicates the user's interaction (e.g., an input indicating that the user is examining an identified object by focusing or zooming the image device). In such embodiments, the persistence of the user input over a predetermined number of frames or time may be required to determine the user interaction with the image device.

Embodiments of the present disclosure include computer-implemented systems and methods for performing image processing based on the context information. For example, in some embodiments, object detection may be invoked when the context information indicates that the user is interacting with the image device to identify objects. Consequently, the likelihood is reduced that object detection will be performed when, for example, there is no object of interest present or the user is otherwise not ready to begin the detection process or one or more classification processes. By way of further example, in some embodiments, classification may be invoked when the context information indicates that the user is interacting with the image device to examine a detected object. Accordingly, the risk is minimized that, for example, classification will be performed prematurely before the object of interest is properly framed or the user does not wish to know classification information for an object of interest.

Additionally, embodiments of the present disclosure include performing image processing operations by applying a neural network trained to process frames received from the image device, such as a medical imaging system. In this fashion, the disclosed embodiments may be adapted to various applications, such as real-time processing of medical videos in a manner that is not disease-specific.

Embodiments of the present disclosure also include systems and methods configured to display real-time video (such as endoscopy video or other medical images) along with object detections and classification information resulting from the image processing. Embodiments of the present disclosure further include systems and methods configured to display real-time video (such as endoscopy video or other medical images) along with an image modification introduced to direct the physician's attention to the feature of interest within the image and/or to provide information regarding that feature or object of interest (e.g., an overlay that includes a border to indicate the location of an object of interest in an image frame, classification information of an object of interest, a zoomed image of an object of interest or a specific region of interest in an image frame, and/or a modified image color distribution). Such information may be presented together on a single display device for viewing by the user (such as a physician or other health care professional). Furthermore, in some embodiments, such information may be displayed depending on when the corresponding image processing operation is invoked based on the context information. Accordingly, as described herein, embodiments of the present disclosure provide such detections and classification information efficiently and when needed, thereby preventing the display from becoming overcrowded with unnecessary information.

In one embodiment, a computer-implemented system for real-time video processing may comprise at least one memory configured to store instructions, and at least one processor configured to execute the instructions. The at least one processor may execute the instructions to receive real-time video generated by a medical image system, the real-time video including a plurality of image frames. While receiving the real-time video generated by the medical image system, the at least one processor may be further configured to obtain context information indicating an interaction of a user with the medical image system. The at least one processor may be further configured to perform an object detection to detect at least one object in the plurality of image frames. The at least one processor may be further configured to perform a classification to generate classification information for the at least one detected object in the plurality of image frames. The at least one processor may be further configured to perform an image modification to modify the received real-time video based on at least one of the object detection and the classification, and generate a display of the real-time video with the image modification on a video display device. The at least one processor may be further configured to invoke at least one of the object detection and the classification based on the context information.

In some embodiments, at least one of the object detection and the classification may be performed by applying at least one neural network trained to process frames received from the medical image system. In some embodiments, the at least one processor may be further configured to invoke the object detection when the context information indicates that the user may be interacting with the medical image system to identify objects. In some embodiments, the at least one processor may be further configured to deactivate the object detection when the context information indicates that the user may be no longer interacting with the medical image system to identify objects. In some embodiments, the at least one processor may be configured to invoke the classification when the context information indicates that the user may be interacting with the medical image system to examine the at least one object in the plurality of image frames. In some embodiments, the at least one processor may be further configured to deactivate the classification when the context information indicates that the user may be no longer interacting with the medical image system to examine the at least one object in the plurality of image frames. In some embodiments, the at least one processor may be further configured to invoke the object detection when context information indicates that the user may be interested in an area in the plurality of image frames containing at least one object, and invoke classification when context information indicates that the user may be interested in the at least one object. In some embodiments, the at least one processor may be further configured to perform an aggregation of two or more frames containing the at least one object, and wherein the at least one processor may be further configured to invoke the aggregation based on the context information. In some embodiments, the image modification comprises at least one of an overlay including at least one border indicating a location of the at least one detected object, classification information for the at least one detected object, a zoomed image of the at least one detected object, or a modified image color distribution.

In some embodiments, the at least one processor may be configured to generate the context information based on an Intersection over Union (IoU) value for the location of the at least one detected object in two or more image frames over time. In some embodiments, the at least one processor may be configured to generate the context information based on an image similarity value in two or more image frames. In some embodiments, the at least one processor may be configured to generate the context information based on a detection or a classification of one or more objects in the plurality of image frames. In some embodiments, the at least one processor may be configured to generate the context information based on an input received by the medical image system from the user. In some embodiments, the at least one processor may be further configured to generate the context information based on the classification information. In some embodiments, the plurality of image frames may include image frames of a gastro-intestinal organ. In some embodiments, the frames may comprise images from the medical image device used during at least one of an endoscopy, a gastroscopy, a colonoscopy, an enteroscopy, a laparoscopy, or a surgical endoscopy. In some embodiments, the at least one detected object may be an abnormality. The abnormality may be a formation on or of human tissue, a change in human tissue from one type of cell to another type of cell, an absence of human tissue from a location where the human tissue is expected, or a lesion.

In still further embodiments, a method is provided for real-time video processing. The method comprises receiving a real-time video generated by a medical image system, wherein the real-time video includes a plurality of image frames. The method further includes providing at least one neural network, the at least one neural network being trained to process image frames from the medical image system and obtaining context information indicating an interaction of a user with the medical image system. The method further includes identifying the interaction based on the context information and performing real-time processing on the plurality of image frames based on the identified interaction by applying the at least one trained neural network.

In some embodiments, performing real-time processing includes performing at least one of an object detection to detect at least one object in the plurality of image frames, a classification to generate classification information for the at least one detected object, and an image modification to modify the received real-time video.

In some embodiments, the object detection is invoked when the identified interaction is the user interacting with the medical image system to navigate to identify objects. In some embodiments, the object detection is deactivated when the context information indicates that the user no longer interacting with the medical image system to navigate to identify objects.

In some embodiments, the classification is invoked when the identified interaction is the user interacting with the medical image system to examine the at least one detected object in the plurality of image frames. In some embodiments, the classification is deactivated when the context information indicates that the user no longer interacting with the medical image system to examine at least one detected object in the plurality of image frames.

In some embodiments, the object detection is invoked when context information indicates that the user is interested in an area in the plurality of image frames containing at least one object, and wherein classification is invoked when context information indicates that the user is interested in the at least one object.

In some embodiments, at least one of the object detection and the classification is performed by applying at least one neural network trained to process frames received from the medical image system.

In some embodiments, the method further comprises performing an aggregation of two or more frames containing at least one object based on the context information. In some embodiments, the image modification comprises at least one of an overlay including at least one border indicating a location of the at least one detected object, classification information for the at least one detected object, a zoomed image of the at least one detected object, or a modified image color distribution.

The plurality of image frames may include image frames of a human organ, such as a gastro-intestinal organ. By way of example, the frames may include images from the medical image device used during at least one of an endoscopy, a gastroscopy, a colonoscopy, an enteroscopy, a laparoscopy, or a surgical endoscopy.

According to the embodiments of the present disclosure, the at least one detected object is an abnormality. The abnormality may be a formation on or of human tissue, a change in human tissue from one type of cell to another type of cell, an absence of human tissue from a location where the human tissue is expected, or a lesion.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

Figure 1:
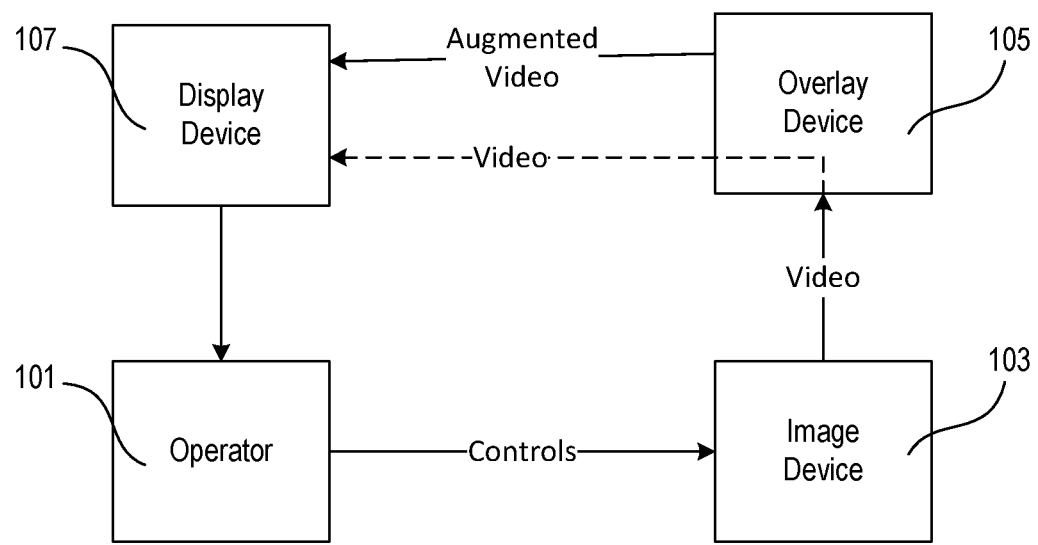
FIG. 1 is a schematic representation of an exemplary computer-implemented system for real-time processing of video and overlaying information on the video feed, according to embodiments of the present disclosure.

The disclosed embodiments of the present disclosure generally relate to computer-implemented systems and methods for processing real-time video from an image device, such as a medical image system. In some embodiments, the disclosed systems and methods may be configured to perform image processing operations, such as object detection and classification. As disclosed herein, the systems and methods may also be configured to identify an interaction of a user with an image device using context information and perform image processing based on the identified interaction. Still further, embodiments of the present disclosure may be implemented with artificial intelligence, such as one or more neural networks trained to process image frames received from the image device. These and other features of the present invention are further disclosed herein.

As will be appreciated from the present disclosure, the disclosed embodiments are provided for purposes of illustration and may be implemented and used in various applications and vision systems. For example, embodiments of the present disclosure may be implemented for medical image analysis systems and other types of systems that perform image processing, including real-time image processing operations. Although embodiments of the present disclosure are described herein with general reference to medical image analysis and endoscopy, it will be appreciated that the embodiments may be applied to other medical image procedures, such as an endoscopy, a gastroscopy, a colonoscopy, an enteroscopy, a laparoscopy, or a surgical endoscopy. Further, embodiments of the present disclosure may be implemented for other environments and vision systems, such as those for or including LIDAR, surveillance, auto-piloting, and other imaging systems.

According to an aspect of the present disclosure, a computer-implemented system is provided for identifying a user interaction using context information and performing image processing based on the identified interaction. The system may include at least one memory (e.g., a ROM, RAM, local memory, network memory, etc) configured to store instructions and at least one processor configured to execute the instruction (see, e.g., FIGS. 1 and 2). The at least one processor may receive real-time video generated by an image device, the real-time video representing a plurality of image frames. For example, the at least one processor may receive the real-time video from a medical imaging system, such as those used during an endoscopy, a gastroscopy, a colonoscopy, or an enteroscopy procedure. Additionally, or alternatively, the image frames may comprise medical images, such as images of a gastro-intestinal organ or other organ or area of human tissue.

As used herein, the term "image" refers to any digital representation of a scene or field of view. The digital representation may be encoded in any appropriate format, such as Joint Photographic Experts Group (JPEG) format, Graphics Interchange Format (GIF), bitmap format, Scalable Vector Graphics (SVG) format, Encapsulated PostScript (EPS) format, or the like. Similarly, the term "video" refers to any digital representation of a scene or area of interest comprised of a plurality of images in sequence. The digital representation may be encoded in any appropriate format, such as a Moving Picture Experts Group (MPEG) format, a flash video format, an Audio Video Interleave (AVI) format, or the like. In some embodiments, the sequence of images may be paired with audio.

The image frames may include representations of a feature-of-interest (i.e., an abnormality or object of interest).

For example, the feature-of-interest may comprise an abnormality on or of human tissue. In some embodiments, the feature-of-interest may comprise an object, such as a vehicle, person, or other entity.

In accordance with the present disclosure, an "abnormality" may include a formation on or of human tissue, a change in human tissue from one type of cell to another type of cell, and/or an absence of human tissue from a location where the human tissue is expected. For example, a tumor or other tissue growth may comprise an abnormality because more cells are present than expected. Similarly, a bruise or other change in cell type may comprise an abnormality because blood cells are present in locations outside of expected locations (that is, outside the capillaries). Similarly, a depression in human tissue may comprise an abnormality because cells are not present in an expected location, resulting in the depression.

In some embodiments, an abnormality may comprise a lesion. Lesions may comprise lesions of the gastro-intestinal mucosa. Lesions may be histologically classified (e.g., per the Narrow-Band Imaging International Colorectal Endoscopic (NICE) or the Vienna classification), morphologically classified (e.g., per the Paris classification), and/or structurally classified (e.g., as serrated or not serrated). The Paris classification includes polypoid and non-polypoid lesions. Polypoid lesions may comprise protruded, pedunculated and protruded, or sessile lesions. Non-polypoid lesions may comprise superficial elevated, flat, superficial shallow depressed, or excavated lesions.

In regards to detected abnormalities, serrated lesions may comprise sessile serrated adenomas (SSA); traditional serrated adenomas (TSA); hyperplastic polyps (HP); fibroblastic polyps (FP); or mixed polyps (MP). According to the NICE classification system, an abnormality is divided into three types, as follows: (Type 1) sessile serrated polyp or hyperplastic polyp; (Type 2) conventional adenoma; and (Type 3) cancer with deep submucosal invasion. According to the Vienna classification, an abnormality is divided into five categories, as follows: (Category 1) negative for neoplasia/dysplasia; (Category 2) indefinite for neoplasia/dysplasia; (Category 3) non-invasive low grade neoplasia (low grade adenoma/dysplasia); (Category 4) mucosal high grade neoplasia, such as high grade adenoma/dysplasia, non-invasive carcinoma (carcinoma in-situ), or suspicion of invasive carcinoma; and (Category 5) invasive neoplasia, intramucosal carcinoma, submucosal carcinoma, or the like.

The processor(s) of the system may comprise one or more image processors. The image processors may be implemented as one or more neural networks trained to process real-time video and perform image operation(s), such as object detection and classification. In some embodiments, the processor(s) include one or more CPUs or servers. According to an aspect of the present disclosure, the processor(s) may also obtain context information indicating an interaction of a user with the image device. In some embodiments, context information may be generated by the processor(s) by analyzing two or more image frames in the real-time video over time. For example, context information may be generated from an Intersection over Union (IoU) value for the location of a detected object in two or more image frames over time. In some embodiments, the IoU value may be compared with a threshold to determine the context of a user's interaction with the image device (e.g., the user is navigating the image device to identify objects). Further, in some embodiments, the persistence of the IoU value meeting the threshold over a predetermined number of frames or time may be required to determine the user interaction with the image device. The processor(s) may also be implemented to obtain the context information based on an analysis of the entire image (i.e., not just the identified object). In some embodiments, the context information is obtained based on classification information.

Additionally, or alternatively, the context information may be generated based on a user input received by the image device that indicates the user's interaction (e.g., an input indicating that the user is examining an identified object by focusing or zooming the image device). In such embodiments, the image device may provide signal(s) to the processor(s) indicating the user input received by the image device (e.g., by pressing a focus or zoom button). In some embodiments, the persistence of the user input over a predetermined number of frames or time may be required to determine the user interaction with the image device.

The processor(s) of the system may identify the user interaction based on the context information. For example, in embodiments employing an IoU method, an IoU value above 0.5 (e.g., approximately 0.6 or 0.7 or higher, such as 0.8 or 0.9) between two consecutive image frames may be used to identify that the user is examining an object of interest. In contrast, an IoU value below 0.5 (e.g., approximately 0.4 or lower) between the same may be used to identify that the user is navigating the image device or moving away from an object of interest. In either case, the persistence of the IoU value (above or below the threshold) over a predetermined number of frames or time may be required to determine the user interaction with the image device.

Additionally or alternatively, context information may be obtained based on a user input to the image device. For example, the user pressing one or more buttons on the image device may provide context information indicating that the user wishes to know classification information, such as class information about an object of interest. Examples of user input indicating that the user wishes to know more information about an object of interest include a focus operation, a zoom operation, a stabilizing operation, a light control operation, and the like. As a further example, other user input may indicate that the user desires to navigate and identify objects. Further example, for a medical image device, the user may control the device to navigate and move the field of view to identify objects of interest. In the above embodiments, the persistence of the user input over a predetermined number of frames or time may be required to determine the user interaction with the image device.

In some embodiments, the processor(s) of the system may perform image processing on the plurality of image frames based on the obtained context information and determined user interaction with the image device. In some embodiments, image processing may be performed by applying at least one neural network (e.g., an adversarial network) trained to process frames received from the image device. For example, the neural network(s) may comprise one of more layers configured to accept an image frame as input and to output an indicator of a location and/or classification information of an object of interest. In some embodiments, image processing may be performed by applying a convolutional neural network.

Consistent with embodiments of the present disclosure, a neural network may be trained by adjusting weights of one or more nodes of the network and/or adjusting activation (or transfer) functions of one or more nodes of the network. For example, weights of the neural network may be adjusted to minimize a loss function associated with the network. In some embodiments, the loss function may comprise a square loss function, a hinge loss function, a logistic loss function, a cross entropy loss function, or any other appropriate loss function or combination of loss functions. In some embodiments, activation (or transfer) functions of the neural network may be modified to improve the fit between one or more models of the node(s) and the input to the node(s). For example, the processor(s) may increase or decrease the power of a polynomial function associated with the node(s), may change the associated function from one type to another (e.g., from a polynomial to an exponential function, from a logarithmic functions to a polynomial, or the like), or perform any other adjustment to the model(s) of the node(s).

In some embodiments, processing the plurality of image frames may include performing object detection to detect at least one object in the plurality of image frames. For example, if an object in the image frames includes a non-human tissue, the at least one processor may identify the object (e.g., based on characteristics such as texture, color, contrast, or the like).

In some embodiments, processing the plurality of image frames may include performing a classification to generate classification information for at least one detected object in the plurality of image frames. For example, if a detected object comprises a lesion, the at least one processor may classify the lesion into one or more types (e.g., cancerous or non-cancerous, or the like). However, the disclosed embodiments are not limited to performing classification on an object identified by an object detector. For example, classification may be performed on an image without first detecting an object in the image. Additionally, classification may be performed on a segment or region of an image likely to contain an object of interest (e.g., identified by a region proposal algorithm, such as a Region Proposal Network (RPN), a Fast Region-Based Convolutional Neural Network (FRCN), or the like).

In some embodiments, processing the plurality of image frames may include determining an image similarity value or other specific image feature between two or more image frames or portions thereof. For example, an image similarity value may be generated based on movement of one or more objects in the plurality of image frames, physical resemblance between one or more objects in the plurality of image frames, likeness between two or more entire image frames or portions thereof, or any other feature, characteristic, or information between two or more image frames. In some embodiments, an image similarity value may be determined based on historical data of the object detection, classification, and/or any other information received, captured, or computed by the system. For example, an image similarity value may be generated from an Intersection over Union (IoU) value for the location of a detected object in two or more image frames over time. Further, an image similarity value may be generated based on whether the detected object resembles a previously detected object. Still further, an image similarity value may be generated based on whether the at least one object is part of a classification in which the user previously showed interest. Additionally, an image similarity value may be generated based on whether the user is performing an action previously performed (e.g., stabilizing the frame, focusing on an object, or any other interaction with the image device). In this manner, the system may learn to recognize user preferences, thereby leading to a more tailored and enjoyable user experience. As can be appreciated from the foregoing, the disclosed embodiments are not limited to any specific type of similarity value or process of generating the same, but rather may be used in conjunction with any suitable process of determining a similarity value between two or more image frames or portions thereof, including processes that involve aggregation of information over time, integration of information over time, averaging information over time, and/or any other method for processing or manipulating data (e.g., image data).

In some embodiments, the object detection, classification, and/or similarity value generation for the at least one object in the plurality of image frames may be controlled based on information received, captured, or generated by the system. For example, the object detection, classification, and/or similarity value may be invoked or deactivated based on context information (e.g., object detection may be invoked when the context information indicates that the user is interacting with the image device to identify objects, and/or classification may be invoked when the context information indicates that the user is interacting with the image device to examine a detected object). As an example, when context information indicates that the user is interested in an area in one or more image frames or a portion thereof, object detection may be invoked to detect all objects in the area of interest. Subsequently, when context information indicates that the user is interested in one or more particular object(s) in the area of interest, classification may be invoked to generate classification information for the object(s) of interest. In this manner, the system may continuously provide information that is of interest to the user in real-time or near real-time. Further, in some embodiments, at least one of the object detection, classification, and/or similarity value generation may be continuously active. For example, object detection may be performed continuously to detect one or more objects of interest in the plurality of frames, and the resulting output may be used in other processes of the system (e.g., classification and/or similarity value generation, to generate context information, or any other function of the system). The continuous activation may be controlled automatically by the system, (e.g., upon powering on) as a result of an input from the user (e.g., pressing a button), or a combination thereof.

As disclosed herein, the processor(s) of the system may generate an overlay to display with the plurality of image frames on a video display device. Optionally, if no object is detected in the plurality of image frames, the overlay may include a null indicator or other indicator that no object was detected.

The overlay may include a border indicating a location of the at least one detected object in the plurality of image frames. For example, in embodiments where the location of the least one detected object comprises a point, the overlay may include a circle, star, or any other shape placed on a point. Additionally, in embodiments where the location comprises a region, the overlay may include a border around the region. In some embodiments, the shape or border may be animated. Accordingly, the shape or border may be generated for a plurality of frames such that it tracks the location of the detected object across the frames as well as appearing animated when the frames are shown in sequence.

In some embodiments, the overlay may be displayed with classification information, such as classification information for at least one detected object in the video feed. For example, in embodiments using the NICE classification system, the overlay may include a label that may be one of "Type 1," "Type 2," "Type 3," "No Polyp," or "Unclear." The overlay may also include information such as a confidence score (e.g., "90%") or the like. In some embodiments, a color, shape, pattern, or other aspect of the overlay may depend on the classification. Further, in embodiments providing a sound and/or vibrational indicator, a duration, frequency, and/or amplitude of the sound and/or vibration may depend on whether an object was detected or the classification.

Consistent with the present disclosure, the system processor(s) may receive a real-time video from an image device and output a video containing the overlay to a display device in real-time. An exemplary disclosure of a suitable embodiment for receiving a video from an image device and outputting a video with the overlay to a display device is described in U.S. application Ser. Nos. 16/008,006 and 16/008,015, both filed on Jun. 13, 2018. These applications are expressly incorporated herein.

In some embodiments, an artificial intelligence (AI) system comprising one or more neural networks may be provided to determine the behavior of a physician or other medical professional during interaction with an image device. Several possible methods can be used for training the AI system. In one embodiment, video frames can be grouped according to, for example, a particular combination of task-organ-illness. For example, a series of video frames can be collected for the detection in the colon of adenoma, or of characterization in the esophagus of Barrett syndrome. In these video frames, the behavior of the different physicians performing the same task may have some common features in the multi-dimensional domain analyzed by the system. When appropriately trained, the AI system presented with similar video frames may be able to identify with a given accuracy that in these video frames the physician is performing a given task. The system may consequently be able to activate an appropriate artificial intelligence sub-algorithm(s) trained to analyze the video frames with high performances, helping the physicians with on-screen information.

In other embodiments, a similar result can be obtained with computer vision analysis of basic features of the images in the time-space domain, analyzing image features such as change in color, velocity, contrast, speed of movement, optical flow, entropy, binary pattern, texture, or the like.

In present disclosure, embodiments are described in the context of polyp detection and characterization in colonoscopy. During conventional colonoscopy, a flexible tube containing a video camera is passed through the anus. The main aim is to examine the colon in its entire length for identifying and possibly removing the small lesion (polyps) that can represent the precursor of colorectal cancer. The physician or other user may navigate through the colon moving the flexible tube, while at the same time may inspect the walls of the colon continuously searching for the presence of potential lesions (detection). Every time the attention of the physician is drawn to a particular region of the image that could possibly be a polyp, the physician may alter the method of navigation, reducing the speed of movement and trying to zoom in on the suspect region. Once a decision has been made on the nature of the suspect lesion (characterization), appropriate action may follow. The physician may perform an in-situ removal of the lesion if believed a potential precursor of cancer or may resume navigation for detection otherwise.

Artificial intelligence systems and algorithms trained with the aim of detecting polyps may be useful during the detection phase, but might be disturbing in other moments, such as during surgery. Similarly, artificial intelligence algorithms trained to characterize a potential lesion as an adenoma or not-adenoma are meaningful during the characterization phase, but are not needed during the detection phase. Thus, the inventors have found that it desirable to have the artificial intelligence system or algorithm for detection active only during the detection phase, and the artificial intelligence system or algorithm for characterization active only during the characterization phase.

Referring now to FIG. 1, a schematic representation is provided of an exemplary computer-implemented system 100 for real-time processing of video and overlaying information on the video feed, according to embodiments of the present disclosure. As shown in FIG. 1, system 100 includes an operator 101 who controls an image device 103. In embodiments where the video feed comprises a medical video, operator 101 may comprise a physician or other health care professional. Image device 103 may comprise a medical imaging device, such as an X-ray machine, a computed tomography (CT) machine, a magnetic resonance imaging (MRI) machine, an endoscopy machine, or other medical imaging device that produces videos or one or more images of a human body or a portion thereof. Operator 101 may control image device 103 by controlling a capture rate of image device 103 and/or a movement of image device 103, e.g., through or relative to the human body. In some embodiments, image device 103 may comprise a Pill-Cam™ device or other form of capsule endoscopy device in lieu of an external imaging device, such as an X-ray machine, or an imaging device inserted through a cavity of the human body, such as an endoscopy device.

As further depicted in FIG. 1, image device 103 may transmit the captured video as a plurality of image frames to an overlay device 105. Overlay device 105 may comprise one or more processors to process the video, as described herein. Additionally or alternatively, the one or more processors may be implemented as separate component(s) (not shown) that are not part of overlay device 105. In such embodiments, the processor(s) may receive the plurality of image frames from the image device 103 and communicate with overlay device 105 to transfer control or information signals for purposes of creating one or more overlays. Also, in some embodiments, operator 101 may control overlay device 105 in addition to image device 103, for example, by controlling the sensitivity of an object detector (not shown) of overlay device 105.

As depicted in FIG. 1, overlay device 105 may augment the video received from image device 103 and then transmit the augmented video to a display device 107. In some embodiments, the augmentation may comprise providing one or more overlays for the video, as described herein. As further depicted in FIG. 1, overlay device 105 may be configured to relay the video from image device 103 directly to display device 107. For example, overlay device 105 may perform a direct relay under predetermined conditions, such as when there is no augmentation or overlay to be generated. Additionally or alternatively, overlay device 105 may perform a direct relay if operator 101 inputs a command to overlay device 105 to do so. The command may be received via one or more buttons included on overlay device 105 and/or through an input device such as a keyboard or the like. In cases where there is video modification or one or more overlay(s), overlay device 105 may create a modified video stream to send to display device. The modified video may comprise the original image frames with the overlay and/or classification information to displayed to the operator via display device 107. Display device 107 may comprise any suitable display or similar hardware for displaying the video or modified video. Other types of video modifications (e.g., a zoomed image of the at least one object, a modified image color distribution, etc.) are described herein.

Figure 2A:
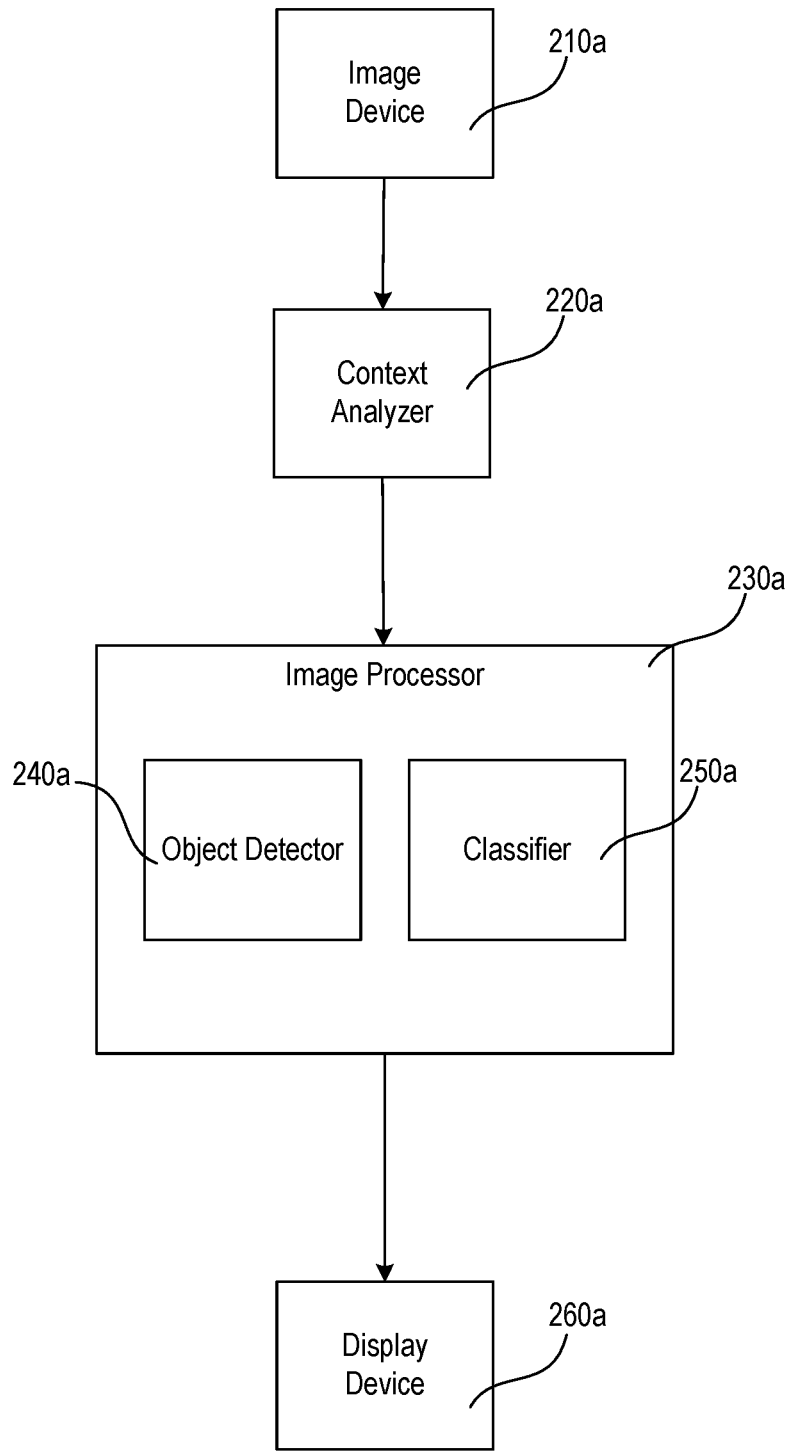
FIGS. 2A and 2B are schematic representations of exemplary computer-implemented systems for real-time image processing using context information, according to embodiments of the present disclosure.
Figure 2B:
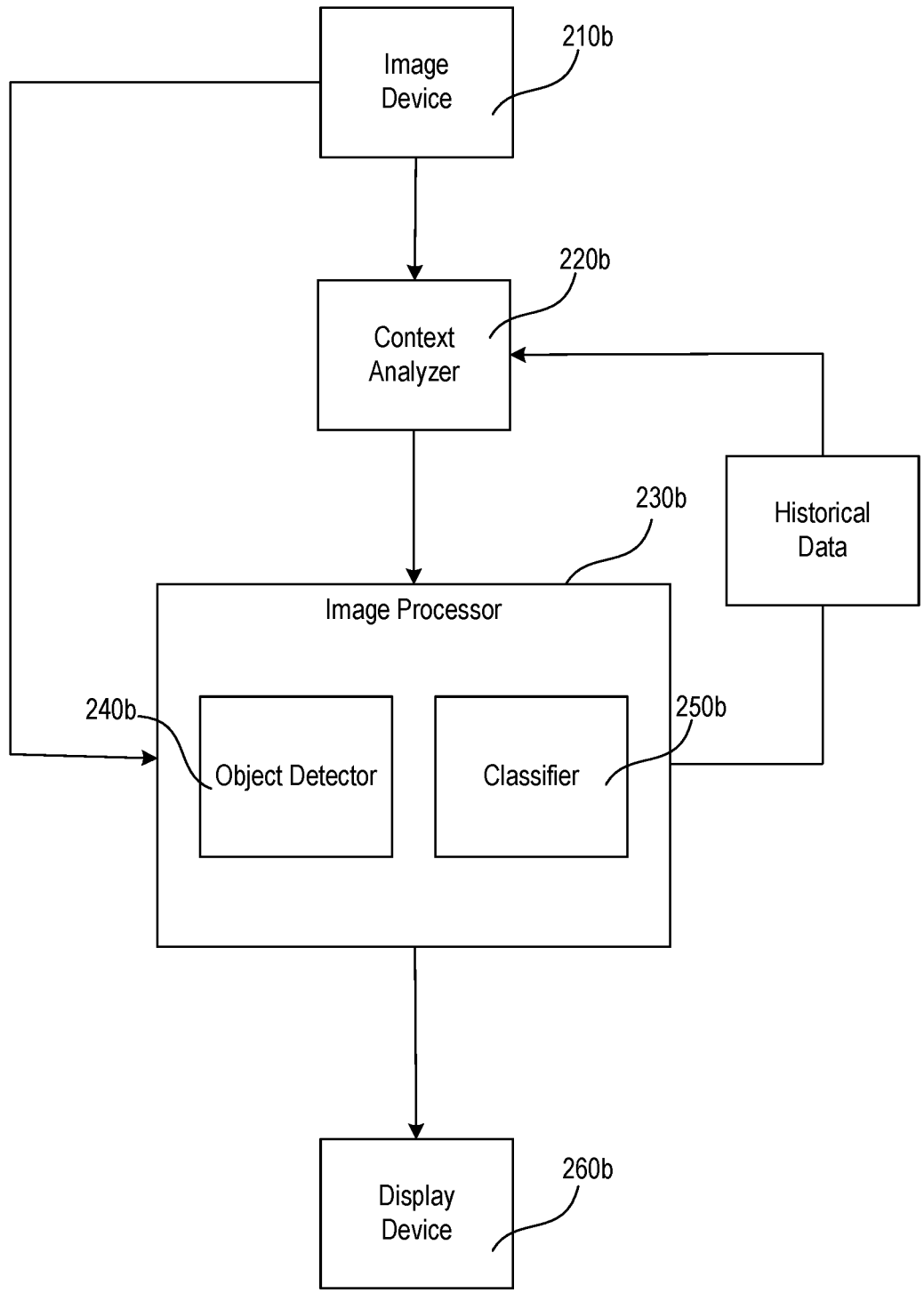

FIGS. 2A and 2B are schematic representations of exemplary computer-implemented systems 200a and 200b, respectively, for real-time image processing using context information, according to embodiments of the present disclosure. FIGS. 2A and 2B illustrate exemplary configurations of the elements of exemplary computer-implemented systems 200a and 200b, respectively, consistent with disclosed embodiments. It is to be understood that other configurations may be implemented and components may be added, removed, or rearranged in view of the present disclosure and various embodiments herein.

In FIGS. 2A and 2B, one or more image processor(s) 230a and 230b may be provided. Image processors 230a and 230b may process image frames acquired by image device 210a and 210b, respectively. Image processors 230a and 230b may comprise object detectors 240a and 240b, respectively, for detecting at least one object of interest in image frames, and classifiers 250a and 250b, respectively, for generating classification information for the at least one object of interest. In some embodiments, object detectors 240a and 240b and classifiers 250a and 250b may be implemented using one or more neural network(s) trained to process image frames. Image processors 230a and 230b may perform other image processing functions, including image modification such as generating an overlay including at least one border indicating a location of at least one detected object, generating classification information for at least one object, zooming into at least one object, modifying image color distribution, or any other adjustments or changes to one or more image frames. Image devices 210a and 210b (similar to image device 103 of FIG. 1) may be an image device of a medical image system or other type of image device. Display devices 260a and 260b may be the same or similar as display device 107 of FIG. 1 and may operate in the same or similar manner as explained above.

Context analyzers 220a and 220b may be implemented separately from image processors 230a and 230b (as shown in FIGS. 2A and 2B) or may be implemented as an integrated component (not shown) with image processors 230a and 230b. Context analyzers 220a and 230b may determine an operator or user interaction with image devices 210a and 210b, respectively, and generate one or more outputs based on the determined user interaction. Context information may be obtained or generated by context analyzers 220a and 220b to determine a user interaction with image devices 210a and 210b, respectively. For example, in some embodiments, context analyzers 220a and 220b may compute an Intersection over Union (IoU) value associated with the location of an object in two or more image frames over time. Context analyzers 220a and 220b may compare the IoU value to a threshold to determine the user interaction with the image device. Additionally, or alternatively, the context information may be generated by context analyzers 220a and 220b by using an image similarity value or other specific image feature of a detected object in two or more image frames over time. The image similarity value or other specific image feature of the detected object may be compared with a threshold to determine the context of a user's interaction with the image device (e.g., the user is navigating the image device to identify objects). If the image similarity value or other specific image feature of the detected object meets the threshold over a predetermined number of frames or time, it may establish a persistence required to determine the user interaction with the image device. Additionally or alternatively, context information may be manually generated by the user, such as by the user pressing a focus or zoom button or providing other input to image devices 210a and 210b, as described herein. In these embodiments, (i) the IoU or image similarity value relative to the threshold or (ii) the identified user input may be required to persist over a predetermined number of frames or time to determine the user interaction with the image device.

In some embodiments, the similarity value generation may be performed using one or more neural network(s) trained to determine an image similarity value or other specific image feature between two or more image frames or portions thereof. In such embodiments, the neural network(s) may determine a similarity value based on any feature, characteristic, and/or information between two or more image frames, including an IoU value, whether the detected object resembles a previously detected object, whether the at least one object is part of a classification in which the user previously showed interest, and/or whether the user is performing an action previously performed. In some embodiments, the similarity value generation may be invoked or deactivated based on information received, captured, and/or generated by the system, including context information, as described herein.

According to the example configuration of FIG. 2A, context analyzer 220a may determine an operator or user interaction with image device 210a and generate instructions for image processor 230a based on the determined user interaction with image device 210a. Context information may be obtained or generated by context analyzer 220a to determine a user interaction with image device 210a. For example, in some embodiments, context analyzer 220a may compute an Intersection over Union (IoU) value associated with the location of an object in two or more image frames over time. Context analyzer 220a may compare the IoU value to a threshold to determine the user interaction with the image device. Additionally or alternatively, context information may be manually generated by the user, such as by the user pressing a focus or zoom button or providing other input to image device 210a, as described above. In these embodiments, (i) the IoU value relative to the threshold or (ii) the identified user input may be required to persist over a predetermined number of frames or time to determine the user interaction with the image device.

Image processor 230a may process image frames based on input received by context analyzer 220a regarding the context analysis. Image processor 230a may perform one or more image processing operations by invoking, for example, object detector 240a, classifier 250a, and/or other image processing components (not shown). In some embodiments, image processing may be performed by applying one or more neural networks trained to process image frames received from image device 210a. For example, context analyzer 220a may instruct image processor 230a to invoke object detector 240a when the context information indicates that the user is navigating using image device 210a. As a further example, context analyzer 220a may instruct image processor 230a to invoke classifier 250a when the context information indicates that the user is examining an object of interest. As will be appreciated by those skilled in the art, image processing is not limited to object detection or classification. For example, image processing may include applying a region proposal algorithm (e.g., Region Proposal Network (RPN), Fast Region-Based Convolutional Neural Network (FRCN), or the like), applying an interest point detection algorithm (e.g., Features from Accelerated Segment Test (FAST), Harris, Maximally Stable Extremal Regions (MSER), or the like), performing image modifications (e.g., overlaying a border or classification information as described herein), or any other adjustments or changes to one or more image frames.

As further shown in FIG. 2A, image processor 230a may generate an output to display device 260a. Display device 260a may be the same or similar as display device 107 of FIG. 1 and may operate in the same or similar manner as explained above. The output may include the original image frames with one or more overlays such as, for example, a border indicating the location of an object detected in the image frame(s) and/or classification information of an object of interest in the frame(s).

In the example configuration of FIG. 2B, image processor 230b may process image frames using information provided by context analyzer 220b, or it may process images captured by image device 210b directly. Context analyzer 220b may be executed consistently throughout the process to determine, when available, context information indicating an interaction of a user with image device 210a and, in response, provide instructions to image processor 230b. Context analyzer 220b may also be implemented to analyze historical data, including IoU values, similarity determinations, and/or other information over time. Image processor 230b may provide a video output to display device 260b, and/or provide one or more outputs of its image processing functions to context analyzer 220b. The video output to display device 260b may comprise the original video with or without modification (e.g., one or more overlays, classification information, etc.) as described herein.

Context analyzer 220b may determine an operator or user interaction with image device 210b and generate instructions for image processor 230b based on the determined user interaction with image device 210b. Context analyzer 220b may determine user interactions using one or more image frames captured by image device 210b (e.g., by computing an IoU value between two or more frames), as disclosed herein. Context analyzer 220b may receive historical data generated by image processor 230b, such as object detections generated by object detector 240b or classifications generated by classifier 250b. Context analyzer 220b may use this information to determine the user interaction with the image device 210b, as described herein. In addition, context analyzer 220b may determine an operator or user interaction based on context information previously obtained by context analyzer 220b itself (e.g., previously calculated IoU values, similarity values, user interaction, and/or other information generated by context analyzer 220b), as described herein.

In some embodiments, context analyzer 220b may process a plurality of image frames from image device 210b and determine that a user is interested in a particular area in the image frames. Context analyzer 220b may then provide instructions to image processor 230b to cause object detector 240b to perform object detection to detect all objects in the identified area of interest. Subsequently, when context information indicates that the user is interested in object(s) in the area of interest, context analyzer 220b may provide instructions to image processor 230b to cause classifier 250b to generate classification information for the object(s) of interest. In this manner, the system may continuously provide information that is of interest to the user in real-time or near real-time, while preventing the display of information for objects that are not of interest. Advantageously, using context information in this manner also avoids undue processing by object detector 240b and classifier 250b since processing is carried out only with respect to the area of interest and object(s) of interest within that area, as derived from the context information.

Image processor 230b may process image frames based on input received by context analyzer 220b regarding the context analysis. In addition, image processor 230b may process image frames captured by image device 210b directly without first receiving instructions from context analyzer 220b. Image processor 230b may perform one or more image processing operations by invoking, for example, object detector 240b, classifier 250b, and/or other image processing components (not shown). In some embodiments, image processing may be performed by applying one or more neural networks trained to process image frames received from image device 210b. For example, context analyzer 220b may instruct image processor 230b to invoke object detector 240b when the context information indicates that the user is navigating using image device 210b. As a further example, context analyzer 220b may instruct image processor 230b to invoke classifier 250b when the context information indicates that the user is examining an object or feature of interest. As will be appreciated by those skilled in the art, image processing is not limited to object detection and classification. For example, image processing may include applying a region proposal algorithm (e.g., Region Proposal Network (RPN), Fast Region-Based Convolutional Neural Network (FRCN), or the like), applying an interest point detection algorithm (e.g., Features from Accelerated Segment Test (FAST), Harris, Maximally Stable Extremal Regions (MSER), or the like), performing image modifications (e.g., overlaying a border or classification information as described herein), or any other adjustments or changes to one or more image frames.

As further shown in FIG. 2B, image processor 230b may generate an output to display device 260b. The output may include the original image frames with one or more image modifications (e.g., overlays such as, for example, a border indicating the location of an object detected in the image frame(s), classification information of an object of interest in the frame(s), zoomed image(s) of an object, a modified image color distribution, etc.). In addition, image processor 230b may provide image processing information to context analyzer 220b. For example, image processor 230b may provide information associated with objects detected by object detector 240b and/or classification information generated by classifier 250b. Consequently, context analyzer 220b may utilize this information to determine an operator or user interaction, as described herein.

Figure 3:
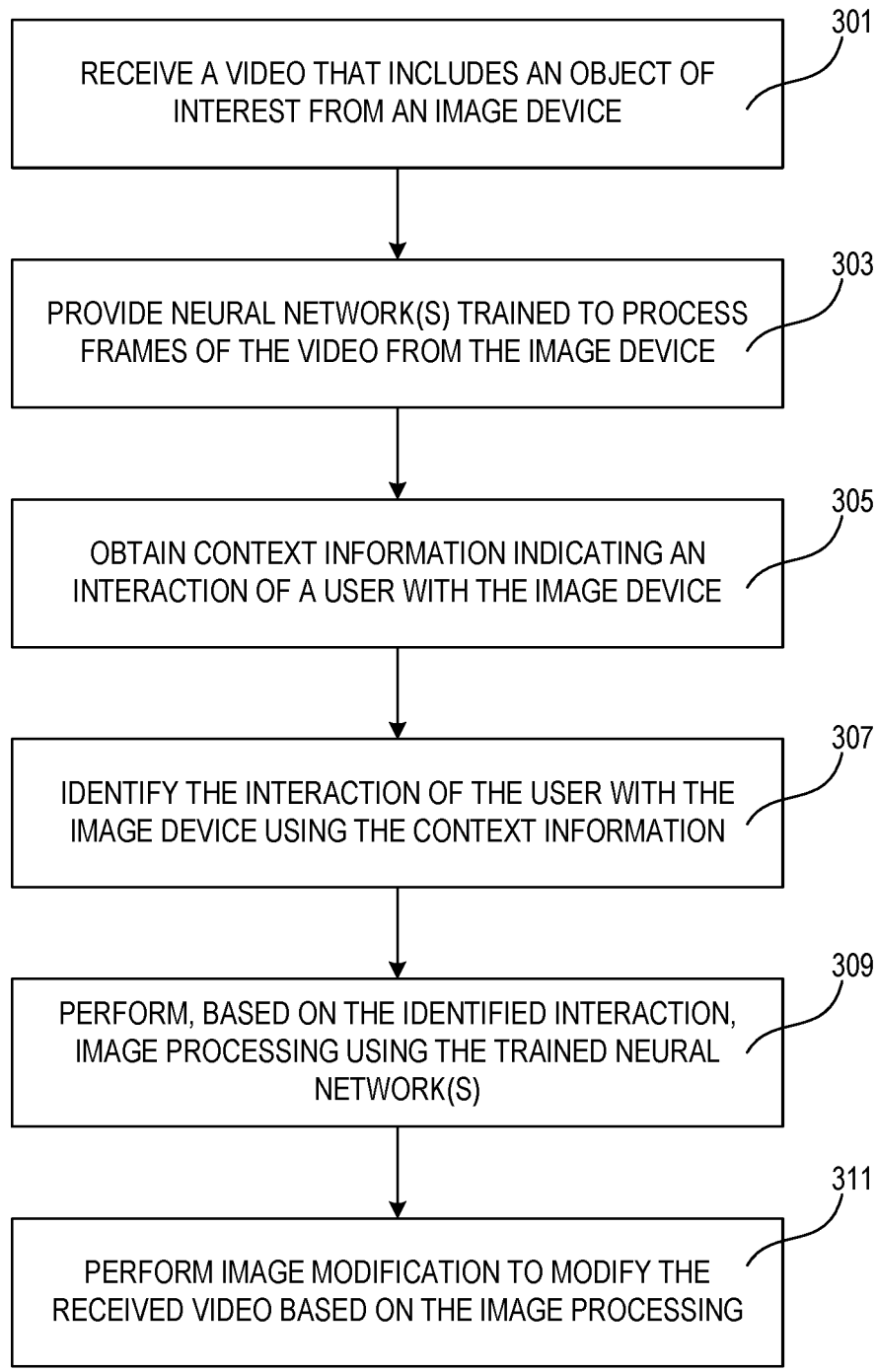
FIG. 3 is a flowchart of an exemplary method for processing a real-time video received from an image device, according to embodiments of the present disclosure.

FIG. 3 is a flowchart of an exemplary method for processing a real-time video received from an image device, according to embodiments of the present disclosure. The embodiment of FIG. 3 may be implemented by one or more processors and other components (such as that shown in the exemplary systems of FIG. 1 or 2). In FIG. 3, a video is processed based on context information. In step 301, the video is received from an image device, such as a medical image system. The video may comprise a plurality of image frames, which may contain one or more objects of interest. In step 303, one or more neural networks trained to process the image frames may be provided. For example, an adversarial neural network may be provided to identify the presence of an object of interest (e.g., a polyp). As an additional example, a convolutional neural network may be provided to classify an image based on texture, color, or the like, based on one or more classes (e.g., cancerous or non-cancerous). In this manner, the image frames may be processed in a manner that is efficient and accurate, while tailored for a desired application.

In step 305, context information may be obtained. The context information may indicate an interaction of the user with the image device, as described herein. In step 307, the context information may be used to identify the interaction of the user. For example, an IoU or image similarity value may be used to identify that the user is navigating to identify an object of interest, inspecting an object of interest, or moving away from an object of interest. Additionally, or alternatively, user input to the image device may provide context information that may be used to determine a user interaction with the image device. As part of step 307, the IoU or similarity value relative to a threshold and/or the presence of the user input may be required to persist over a predetermined number of frames or time before the processor(s) identify that a particular user interaction with the image device is present. In step 309, image processing may be performed based on the identified interaction (context information) using the one or more trained neural networks, as described above. For example, if the identified interaction is navigating, the image processor may perform object detection. As another example, if the identified interaction is inspecting, the image processor may perform classification. In step 311, image modification on the received video may be performed based on the image processing. For example, as part of step 311, one or more overlay(s) and/or classification information may be generated based on the image processing performed in step 309. As disclosed herein, the overlay(s) may be displayed to the user or operator via a display device. For example, the video output that is displayed may include a border (e.g., a box, or star) indicating a detected object in the image frames and/or classification information (e.g., a text label such as "Type 1," "Type 2," or "Type 3") of an object of interest in the image frames.

Figure 4:
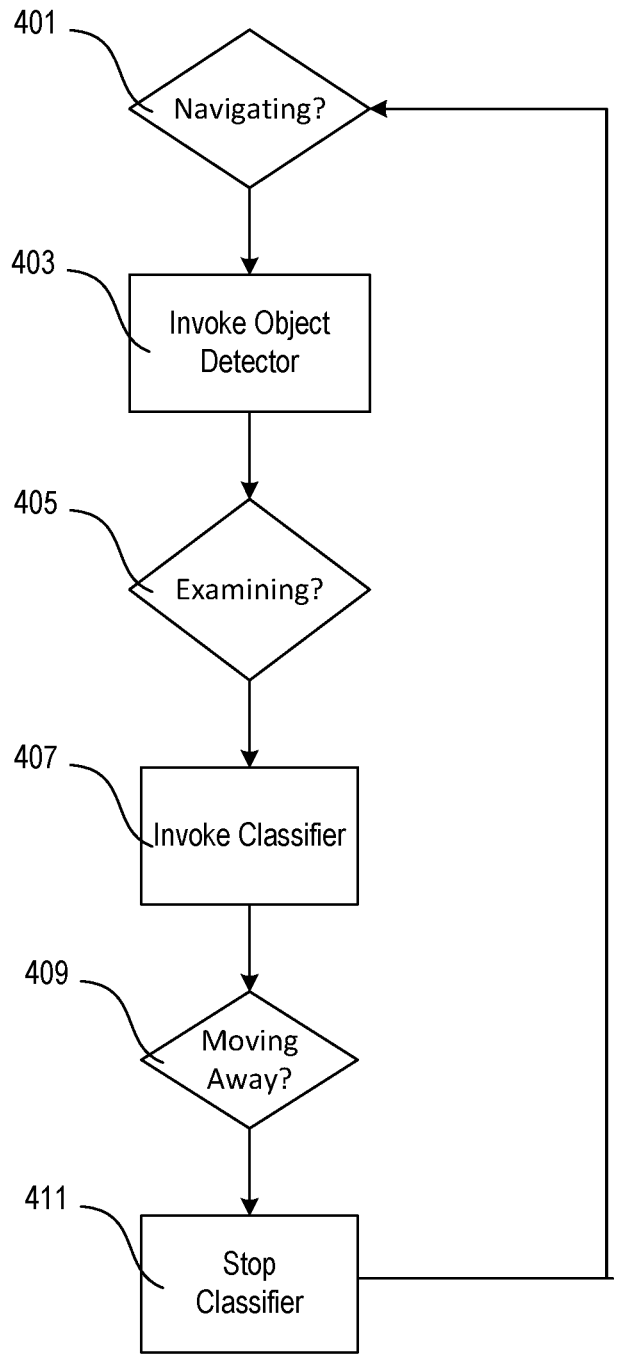
FIG. 4 is a flowchart of an exemplary method of invoking image processing operations based on context information indicating a user's interaction with the image device, according to embodiments of the present disclosure.

FIG. 4 is a flowchart of an exemplary method of invoking image processing operations based on context information indicating user interactions with the image device, according to embodiments of the present disclosure. The embodiment of FIG. 4 may be implemented by one or more processors and other components (such as that shown in the exemplary systems of FIG. 1 or 2). In FIG. 4, object detection and classification operations are invoked based on an identified user interaction with an image device. In step 401, the processor(s) may determine if a user is navigating using the image device (e.g., navigating through a body part during colonoscopy to identify objects of interest). In the case where the user is determined to be navigating, in step 403, an object detector may be invoked. For example, a neural network trained to detect adenoma in the colon may be invoked. In step 405, the processor(s) may determine whether a user is examining an object of interest (e.g., holding the image device steady to analyze an object of interest in the frames). In the case where the user is determined to be examining, in step 407, a classifier may be invoked. For example, a neural network trained to characterize signs of Barrett syndrome in the esophagus may be invoked. In step 409, whether the user is moving away from an object of interest may be detected. If the user is determined to be moving away, in step 411, the classifier may be stopped.

Figure 5:
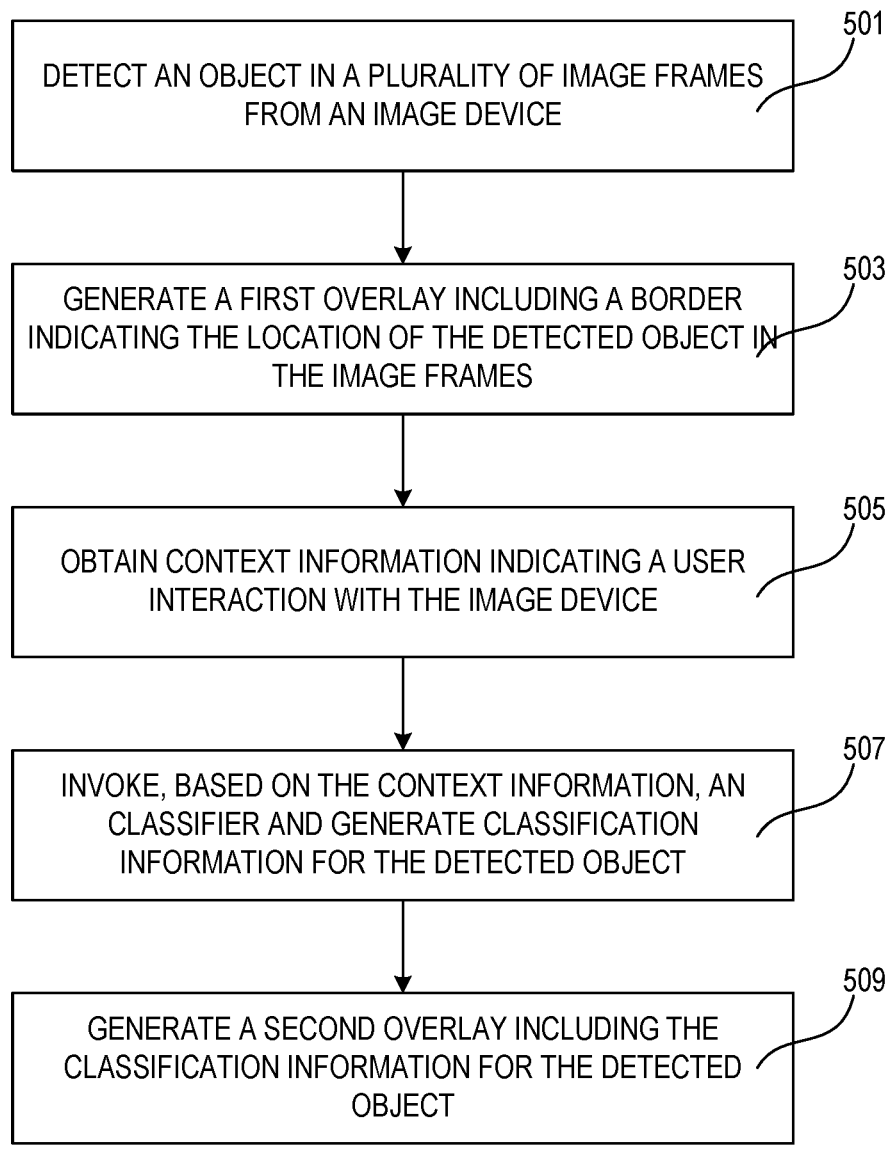
FIG. 5 is a flowchart of an exemplary method for generating overlay information on a real-time video feed from an image device, according to embodiments of the present disclosure.

FIG. 5 is a flowchart of an exemplary method for generating overlay information on a real-time video feed from an image device, according to embodiments of the present disclosure. The embodiment of FIG. 5 may be implemented by one or more processors and other components (such as that shown in the exemplary systems of FIG. 1 or 2). In FIG. 5, overlays are generated based on the analysis of context information, wherein the overlay displays provide, for example, location and classification information of an object in image frames. In step 501, the processor(s) may detect an object in a plurality of image frames in the real-time video feed. This may be done by applying an object detection algorithm or trained neural network, as explained above. In step 503, a first overlay display may be generated that includes a border indicating the location of the detected object in the image frames. For example, the first overlay display may include a circle, star, or other shape to designate the point location of the detected object. As an additional example, if the location of the object comprises a region, the first overlay display may include a box, rectangle, circle, or another shape placed over the region. In step 505, the processor(s) may obtain context information indicating a user interaction. As discussed above, the context information may be obtained by analyzing the video (i.e., IoU or image similarity method) and/or user input (i.e., a focus or zoom operation). In step 506, classification information of an object of interest in the image frames may be generated by invoking a classifier or classification algorithm, as explained herein. In step 504, a second overlay display may be generated that includes the classification information. For example, the second overlay display may include an overlay with a border indicating the location of an object of interest and a text label (e.g., "Polyp" or "Non-Polyp") that provides the classification information. Additionally, or alternatively, in some embodiments a color, shape, pattern, or other aspect of the first and/or second overlay may depend on the detection of an object and/or the classification.

Figure 6:
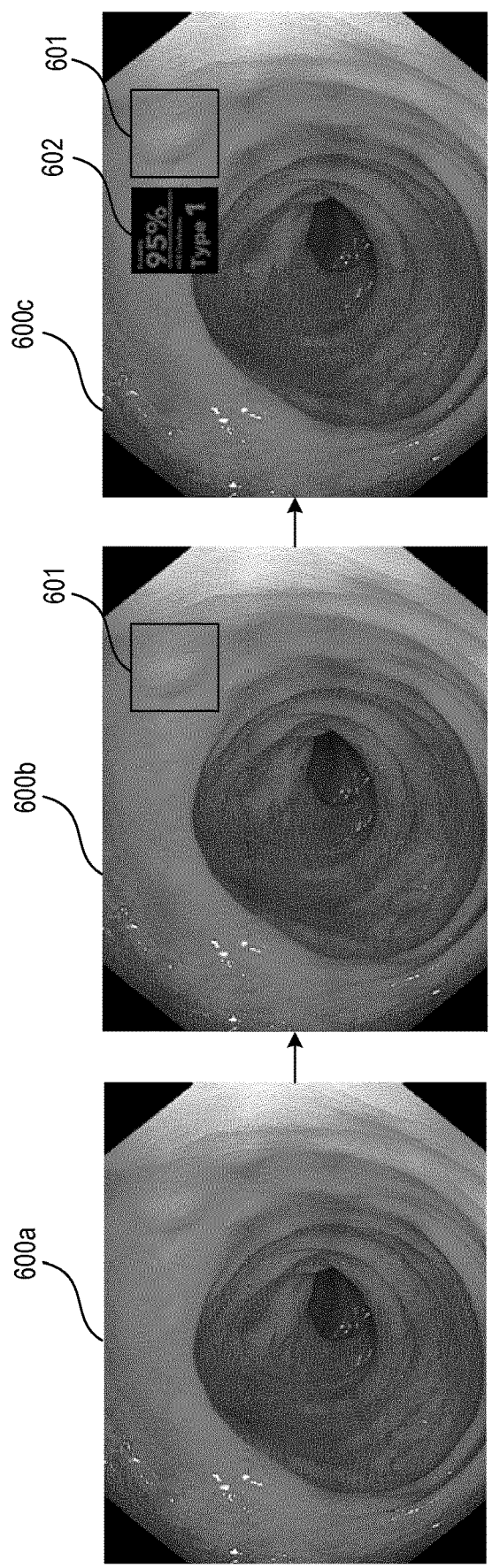
FIG. 6 is an example of a display with an overlay for object detection and related classification information in a video, according to embodiments of the present disclosure.

FIG. 6 is an example of a display with overlays in a video based on object detections and classification, according to embodiments of the present disclosure. In the example of FIG. 6 (as well as FIGS. 7A and 7B), the illustrated video samples 600a, 600b, and 600c are from a colonoscopy procedure. It will be appreciated from the present disclosure, that video from other procedures and imaging devices may be utilized when implementing embodiments of the present disclosure. Thus, the video samples 600a, 600b, and 600c (as well as FIGS. 7A and 7B) are non-limiting examples of the present disclosure. In addition, by way of example, the video display of FIG. 6 (as well as FIGS. 7A, and 7B) may be presented on a display device, such as display device 107 of FIG. 1.

First overlay 601 represents one example of a graphical border used as an indicator for a detected object (e.g., an abnormality) in a video. In the example of FIG. 6, first overlay 601 comprises an indicator in the form of a solid rectangular border. In other embodiments, first overlay 601 may be a different shape (whether regular or irregular). In addition, first overlay 601 may be displayed in a predetermined color, or transition from a first color to another color. First overlay 601 appears in video frame 600b and 600c, which may follow in sequence from video frame 600a.

Second overlay 602 presents one example of a classification of an object of interest (e.g., abnormality) in a video. In the example of FIG. 6, second overlay 602 comprises a text label identifying the type of abnormality (e.g., "Type 1" according to a classification system, such as the NICE classification system). As can be appreciated from video sample 600c, second overlay 602 may comprise other information besides a classification label. For example, a confidence label associated with the classification (e.g., "95%") may be included in second overlay 602.

Figure 7A:
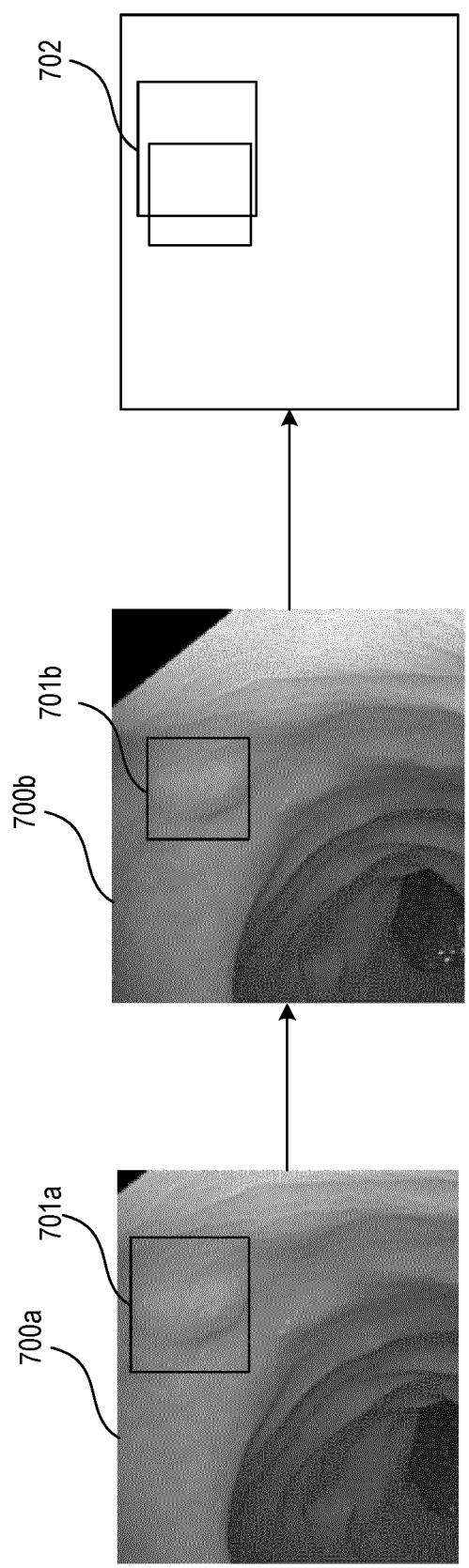
FIG. 7A is an example of a visual representation of determining an Intersection over Union (IoU) value for a detected object in two image frames, according to embodiments of the present disclosure.

FIG. 7A is an example of a visual representation of determining an Intersection over Union (IoU) value for an object in two image frames, according to embodiments of the present disclosure. As shown in FIG. 7A, images 700a and 700b comprise frames of a video including an object of interest. FIG. 7A depicts an image 700a and a later image 700b. In the example of FIG. 7A, areas 701a and 701b represent the location and size of an object of interest detected in images 700a and 700b, respectively. In addition, area 702 represents the combination of areas 701a and 701b, and which represents a visual representation of determining the IoU value for the detected object in images 700a and 700b. In some embodiments, an IoU value may be estimated using the following formula:

$$\text{Intersection over Union }(IoU) = \frac{\text{Area of Overlap}}{\text{Area of Union}}$$

In the above IoU formula, Area of Overlap is the area where the detected object is present in both images, and Area of Union is the total area where the detected object is present in the two images. In the example of FIG. 7A, an IoU value may be estimated using a ratio between an area of overlap between areas 701a and 701b (i.e., center of area 702) and the area of union between areas 701a and 701b (i.e., entire area 702). In the example of FIG. 7A, the IoU value may be regarded as low given that the center of area 702 is comparatively smaller than the entire area 702. In some embodiments, this may indicate that the user is moving away from the object of interest.

Figure 7B:
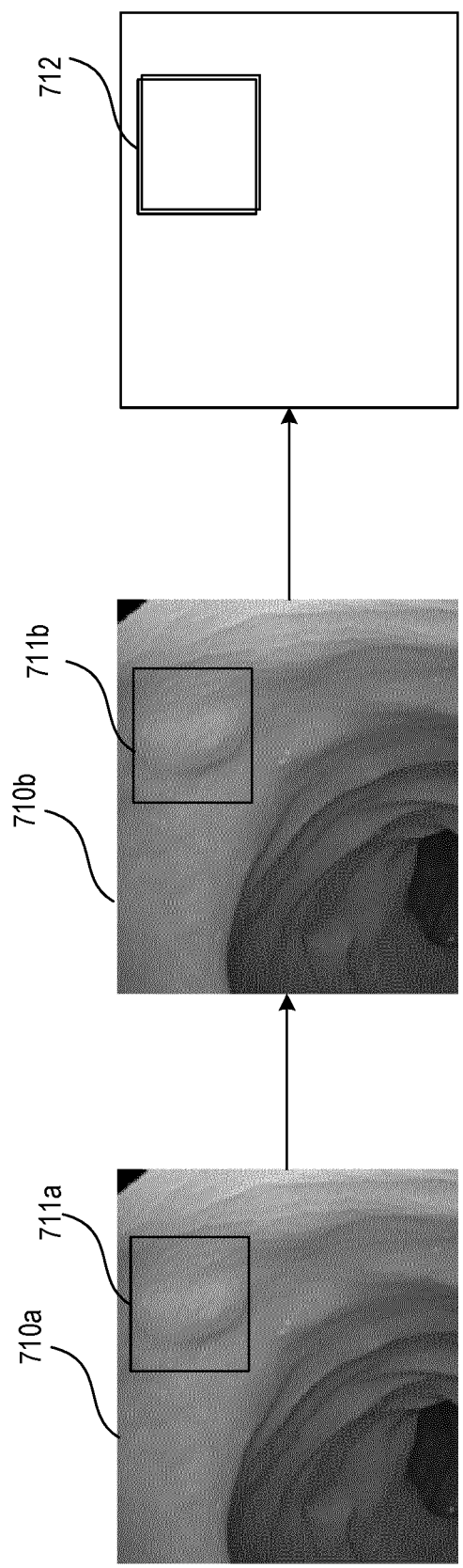
FIG. 7B is another example of a visual representation of determining an Intersection over Union (IoU) value for a detected object in two image frames, according to embodiments of the present disclosure.

FIG. 7B is another example of a visual representation of determining an Intersection over Union (IoU) value for an object in two image frames, according to embodiments of the present disclosure. As shown in FIG. 7B, images 710a and 720b comprise frames of a video including an object of interest. FIG. 7B depicts an image 710a and a later image 710b (similar to images 700a and 700b). In the example of FIG. 7B, areas 711a and 711b represent the location and size of an object of interest detected in images 710a and 710b, respectively. In addition, area 712 represents the combination of areas 711a and 711b, and which represents a visual representation of determining the IoU value for the detected object in images 710a and 710b. The same IoU formula as that described above for FIG. 7A may be used to determine the IoU value. In the example of FIG. 7B, an IoU value may be estimated using a ratio between an area of overlap between areas 711a and 711b (i.e., center of area 712) and the area of union between areas 711a and 711b (i.e., entire area 712). In the example of FIG. 7B, the IoU value may be regarded as high given that the center of area 712 is comparatively equal to the entire area 712. In some embodiments, this may indicate that the user is examining the object of interest.

Figure 8:
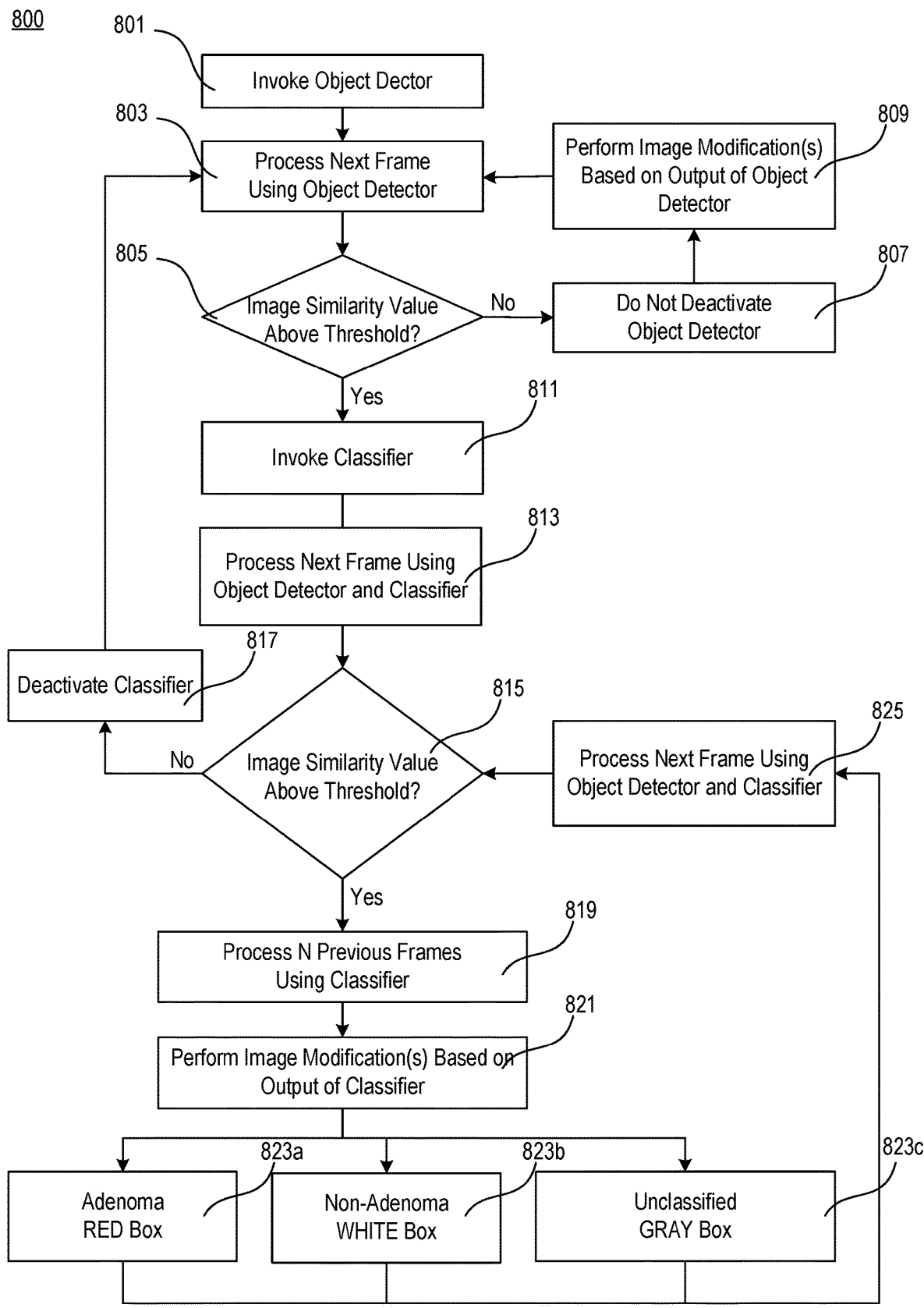
FIG. 8 is a flowchart of another exemplary method for real-time image processing, consistent with embodiments of the present disclosure.

FIG. 8 is a flowchart of an exemplary method of invoking an object detector and a classifier where the context information is determined based on an image similarity value between multiple frames, according to embodiments of the present disclosure. It is to be understood, however, that the method may be used in conjunction with other ways to determine context information, such as those based on an IoU value, a detection or a classification of one or more objects in an image frame, or an input received by the medical image system from the user. The embodiment of FIG. 8 may be implemented by one or more processors and other components (such as that shown in the exemplary systems of FIG. 1 or 2).

In step 801, an object detector (e.g., object detectors 240a and 240b in FIGS. 2A and 2B) is invoked to detect an object of interest in a first image frame. For example, one or more neural networks trained to detect a specific disease or abnormality (e.g., adenoma in the colon) may be invoked to determine whether the specific disease or abnormality is present in the first image frame. The object detector may be invoked for the same or similar reasons as discussed above in connection with other embodiments. In step 803, the object detector processes a second image frame obtained subsequent to the first image frame to determine the presence or absence of the object of interest in the second image frame. For example, the one or more neural networks may detect that a polyp consistent with adenoma in the colon is present in the second image frame.

In step 805, a determination is made as to whether a similarity value between the first and second image frames are above a predetermined threshold to determine the context information. The determination may be made using an image similarity evaluator (not shown). The similarity evaluator may be implemented with a processor and comprise one or more algorithms for processing an image frame as input and to output a similarity value between two or more image frames using image features, such as image overlap, edges, points of interest, regions of interest, color distribution, or the like. In some embodiments, the similarity evaluator may be configured to output a number between 0 and 1 (e.g., 0.587), where a similarity value of 1 means that the two or more image frames are identical, and a similarity value of 0 means that the two or more image frames have no similarity. In some embodiments, the image similarity evaluator may be part of a context analyzer (e.g., context analyzer 220a and 220b in FIGS. 2A and 2B) or image processor (e.g., image processors 230a and 230b of FIGS. 2A and 2B), such as part of an object detector (e.g., object detectors 240a and 240b of FIGS. 2A and 2B) or a classifier (e.g., classifiers 250a and 250b of FIGS. 2A and 2B).

The similarity value computation may be performed using one or more features of the first and second image frames. For example, a determination may be made as to whether a sufficient portion of the first image frame is contained in the second image frame to identify that the user is examining an object of interest. As a non-limiting example, if at least 0.5 (e.g., approximately 0.6 or 0.7 or higher, such as 0.8 or 0.9) of the first image frame is contained in the second image frame, this may be used to identify that the user is examining an object of interest. In contrast, if less than 0.5 (e.g., approximately 0.4 or lower) of the first image frame is contained in the second image frame, this may be used to identify that the user is navigating the image device or moving away from an object of interest. It is to be understood, however, that the determination may be made using other image features, such as edges, points of interest, regions of interest, color distribution, or the like.

In step 807, if the context information indicates that the user is not examining an object of interest, such as by determining that the image similarity value is below the predetermined threshold, the object detector remains invoked to obtain its output and to process a next image frame, starting over at step 803 of the exemplary method of FIG. 8. In some embodiments, the object detector may be deactivated at step 807. For example, the object detector may be deactivated when the context information indicates that the user no longer wishes to detect objects. This may be determined when, for example, a user interacts with an input device (e.g., a button, mouse, keyboard, or the like) to deactivate the object detector. In this manner, detection is performed efficiently and only when needed, thereby preventing, for example, a display from becoming overcrowded with unnecessary information.

In step 809, image modification(s) are performed to modify the received image frames based on the output of the object detector. For example, overlay information on a real-time video feed from an image device may be generated, according to embodiments of the present disclosure. The overlay information may include, for example, a location of an object of interest detected by the object detector, such as a circle, star, or other shape to designate the location of the detected object. As an additional example, if the location of the object comprises a region, the overlay information may include a box, rectangle, circle, or another shape placed over the region. It is to be understood, however, that other image modifications may be used to bring the user's attention to the detected object, such as zooming into a region of the detected object, altering image color distribution, or the like.

In step 811, a classifier (e.g., classifiers 250*a* and 250*b* in FIGS. 2A and 2B) is invoked to generate classification information for at least one detected object, consistent with disclosed embodiments. For example, if a detected object comprises a lesion, the classifier may classify the lesion into one or more types (e.g., cancerous or non-cancerous, or the like). In some embodiments, one or more neural networks (e.g., an adversarial neural network) trained to classify objects may be invoked to classify the detected object, consistent with disclosed embodiments. In step 813, both the object detector and the classifier process a next frame (e.g., a third image frame obtained subsequent to the second image frame) to determine the presence or absence of the object of interest in the that image frame, and to generate classification information if the object of interest is detected. For example, one or more neural networks may detect that a polyp consistent with adenoma in the colon is present in the image frame, and may subsequently generate a label such as "Adenoma" if it determines that the polyp is indeed an adenoma, or a label such as "Non-Adenoma" if it determines that the polyp is not an adenoma, along with a confidence score (e.g., "90%").

At step 815, a determination is made as to whether a similarity value between the image frames (e.g., the second and third image frames) are above a predetermined threshold to determine the context information. This may be performed in the same or similar manner as described above in connection with step 805. In step 817, if the context information indicates that the user is no longer examining the object of interest, such as by determining that the image similarity value is below the predetermined threshold, the classifier is deactivated, and the object detector remains invoked to process a next image frame, starting over at step 803. In this manner, classification is performed efficiently and only when needed, thereby preventing, for example, a display from becoming overcrowded with unnecessary information. In step 819, in contrast, if the context information indicates that the user continues to examine the object of interest, the classifier processes N (i.e., two or more) number of image frames to generate classification information for at least one detected object. An algorithm may be applied to the output of the classifier for all N image frames to generate a single output. For example, a moving average computation may be applied to integrate the output of the classifier for each image frame over the time dimension. Since classification information of a particular polyp into a class (e.g., adenoma or not-adenoma) can be influenced by different characteristics (e.g., texture, color, size, shape, etc.), the output of the classifier may be influenced by noise in some of the N frames where the polyp is present. In order to reduce this phenomenon, a form of moving average integrating the output of the classifier for the last N frames can be implemented. As a non-limiting example, an arithmetic mean may be computed, but other mathematical and statistical formulations can be used to obtain the same result.

In step 821, image modification(s) are performed to modify the received image frames based on the output of the classifier. For example, overlay information on a real-time video feed from an image device may be generated for a detected object in the same or similar manner as described above in connection with step 809. In addition, the overlay information may be displayed with classification information generated by the classifier for the detected object. The classification information may include the same or similar information described above in connection with step 813. In steps 823*a*, 823*b*, and 823*c*, for example, different classification information is generated for a detected object depending on the classification. In step 823*a*, a label "Adenoma" may be generated together with a red box around the detected object, if the detected object is a polyp classified by the classifier as an adenoma. In step 823*b*, a label "Non-Adenoma" may be generated together with a white box around the detected object, if the detected object is a polyp classified by the classifier as a non-adenoma. In step 823*c*, a label "Unclassified" may be generated together with a gray box around the detected object, if the detected object cannot be classified by the classifier as a result of, for example, lack of focus, corrupt image data, or the like.

In step 825, both the object detector and the classifier process a next available image frame to determine the presence or absence of the object of interest, and to generate classification information if the object of interest is detected, starting over at step 815 of the method of FIG. 8.

The present disclosure has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

According to some embodiments, the operations, techniques, and/or components described herein can be implemented by a device or system, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that can incorporate hard-wired and/or program logic to implement the techniques and other features of the present disclosure.

The one or more special-purpose computing devices can be generally controlled and coordinated by operating system software, such as IOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems can control and schedule computer processes for execution, perform memory management, provide file system, networking, I/O services, and provide a user interface functionality, such as a graphical user interface ("GUI"), among other things.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

It is intended, therefore, that the specification and examples be considered as example only, with a true scope and spirit being indicated by the following claims and their full scope of equivalents.

The invention claimed is:

1. A computer-implemented system for real-time video processing, comprising:
   at least one memory configured to store instructions; and
   at least one processor configured to execute the instructions to perform operations comprising:
   receive real-time video generated by a medical image system, the real-time video including a plurality of image frames; and
   while receiving the real-time video generated by the medical image system:
     process the plurality of image frames of the real-time video to obtain context information indicating an interaction of a user with the medical image system;
     perform an object detection to detect at least one object in the plurality of image frames;
     perform a classification to generate classification information for the at least one detected object in the plurality of image frames; and
     perform an image modification to modify the received real-time video based on at least one of the object detection and the classification; and
     generate a display of the real-time video with the image modification on a video display device;
   wherein the at least one processor is further configured to invoke at least one of the object detection and the classification based on the interaction of the user with the medical image system indicated by the context information.

2. The system of claim 1, wherein at least one of the object detection and the classification is performed by applying at least one neural network trained to process frames received from the medical image system.

3. The system of claim 1, wherein the at least one processor is configured to invoke the object detection when the context information indicates that the user is interacting with the medical image system to identify objects.

4. The system of claim 1, wherein the at least one processor is further configured to deactivate the object detection when the context information indicates that the user is no longer interacting with the medical image system to identify objects.

5. The system of claim 1, wherein the at least one processor is configured to invoke the classification when the context information indicates that the user is interacting with the medical image system to examine the at least one object in the plurality of image frames.

6. The system of claim 1, wherein the at least one processor is further configured to deactivate the classification when the context information indicates that the user is no longer interacting with the medical image system to examine the at least one object in the plurality of image frames.

7. The system of claim 1, wherein the at least one processor is further configured to invoke the object detection when context information indicates that the user is interested in an area in the plurality of image frames containing at least one object, and wherein the at least one processor is further configured to invoke classification when context information indicates that the user is interested in the at least one object.

8. The system of claim 1, wherein the at least one processor is further configured to perform an aggregation of two or more frames containing the at least one object, and wherein the at least one processor is further configured to invoke the aggregation based on the context information.

9. The system of claim 1, wherein the image modification comprises at least one of an overlay including at least one border indicating a location of the at least one detected object, classification information for the at least one object, a zoomed image of the at least one object, or a modified image color distribution.

10. The system of claim 1, wherein the at least one processor is configured to generate the context information based on an Intersection over Union (IoU) value for the location of the at least one detected object in two or more image frames over time.

11. The system of claim 1, wherein the at least one processor is configured to generate the context information based on an image similarity value in two or more image frames.

12. The system of claim 1, wherein the at least one processor is configured to generate the context information based on a detection or a classification of one or more objects in the plurality of image frames.

13. The system of claim 1, wherein the at least one processor is configured to generate the context information based on an input received by the medical image system from the user.

14. The system of claim 1, wherein the at least one processor is further configured to generate the context information based on the classification information.

15. The system of claim 1, wherein the plurality of image frames include image frames of a gastro-intestinal organ.

16. The system of claim 1, wherein the plurality of image frames comprise images from a medical image device used during at least one of an endoscopy, a gastroscopy, a colonoscopy, an enteroscopy, a laparoscopy, or a surgical endoscopy.

17. The system of claim 1, wherein the at least one detected object is an abnormality.

18. The system of claim 17, wherein the abnormality comprises at least one of a formation on or of human tissue, a change in human tissue from one type of cell to another type of cell, an absence of human tissue from a location where the human tissue is expected, or a lesion.

19. A method for real-time video processing, comprising:
receiving a real-time video generated by a medical image system, the real-time video including a plurality of image frames;
providing at least one neural network, the at least one neural network being trained to process image frames from the medical image system;
processing the plurality of image frames of the real-time video to obtain context information indicating an interaction of a user with the medical image system;
identifying a type of the interaction based on the context information; and
performing real-time processing on the plurality of image frames based on the identified type of the interaction by applying the at least one trained neural network.

20. The method of claim 19, wherein performing real-time processing includes performing at least one of an object detection to detect at least one object in the plurality of image frames, a classification to generate classification information for the at least one detected object, and an image modification to modify the received real-time video.

21. The method of claim 20, wherein the object detection is invoked when the identified interaction is the user interacting with the medical image system to navigate to identify objects.

22. The method of claim 20, wherein the object detection is deactivated when the context information indicates that the user no longer interacting with the medical image system to navigate to identify objects.

23. The method of claim 20, wherein the classification is invoked when the identified interaction is the user interacting with the medical image system to examine the at least one detected object in the plurality of image frames.

24. The method of claim 20, wherein the classification is deactivated when the context information indicates that the user no longer interacting with the medical image system to examine at least one detected object in the plurality of image frames.

25. The method of claim 20, wherein the object detection is invoked when context information indicates that the user is interested in an area in the plurality of image frames containing at least one object, and wherein classification is invoked when context information indicates that the user is interested in the at least one object.

26. The method of claim 20, wherein at least one of the object detection and the classification is performed by applying at least one neural network trained to process frames received from the medical image system.

27. The method of claim 20, wherein the image modification comprises at least one of an overlay including at least one border indicating a location of the at least one detected object, classification information for the at least one detected object, a zoomed image of the at least one detected object, or a modified image color distribution.

28. The method of claim 20, wherein the at least one detected object is an abnormality.

29. The method of claim 28, wherein the abnormality comprises at least one of a formation on or of human tissue, a change in human tissue from one type of cell to another type of cell, an absence of human tissue from a location where the human tissue is expected, or a lesion.

30. The method of claim 19, further comprising the step of performing an aggregation of two or more frames containing at least one object based on the context information.

31. The method of claim 19, wherein the plurality of image frames include image frames of a gastro-intestinal organ.

32. The method of claim 19, wherein the frames comprise images from medical image device used during at least one of an endoscopy, a gastroscopy, a colonoscopy, an enteroscopy, a laparoscopy, or a surgical endoscopy.

* * * * *